United States Patent
Vigneau

(10) Patent No.: US 12,511,990 B2
(45) Date of Patent: Dec. 30, 2025

(54) METHOD, DEVICE AND SERVER FOR DETERMINING A SPEED LIMIT ON A ROAD SEGMENT

(71) Applicant: Continental Automotive GmbH, Hannover (DE)

(72) Inventor: Willy Vigneau, Toulouse (FR)

(73) Assignee: CONTINENTAL AUTOMOTIVE TECHNOLOGIES GMBH, Hannover (DE)

( * ) Notice: Subject to any disclaimer, the term of this patent is extended or adjusted under 35 U.S.C. 154(b) by 545 days.

(21) Appl. No.: 17/990,034

(22) Filed: Nov. 18, 2022

(65) Prior Publication Data
US 2023/0186759 A1     Jun. 15, 2023

(30) Foreign Application Priority Data
Dec. 10, 2021 (FR) ...................................... 2113325

(51) Int. Cl.
*B60W 40/02*     (2006.01)
*G06F 16/903*     (2019.01)
(Continued)

(52) U.S. Cl.
CPC ..... *G08G 1/0129* (2013.01); *G06F 16/90335* (2019.01); *G06V 20/582* (2022.01); *G08G 1/01* (2013.01); *G08G 1/0104* (2013.01)

(58) Field of Classification Search
CPC .............. G06G 1/01; G06G 1/0104; G06G 1/07–1/14; G06F 16/90335;
(Continued)

(56) References Cited

U.S. PATENT DOCUMENTS

| | | | |
|---|---|---|---|
| 8,428,307 B2 | 4/2013 | Bradai et al. | |
| 9,747,506 B2 * | 8/2017 | Mullen | G08G 1/096775 |

(Continued)

FOREIGN PATENT DOCUMENTS

| | | | | |
|---|---|---|---|---|
| CN | 101479733 A | * | 7/2009 | ......... G01C 21/3492 |
| DE | 102016119135 A1 | * | 4/2017 | ........... G08G 1/0112 |

(Continued)

OTHER PUBLICATIONS

Zinoune, Clément. Autonomous integrity monitoring of navigation maps on board intelligent vehicles. Diss. Université de Technologie de Compiègne,. (Year: 2014).*

(Continued)

*Primary Examiner* — Cuong H Nguyen
(74) *Attorney, Agent, or Firm* — Buchanan Ingersoll & Rooney PC

(57) ABSTRACT

A method for determining a speed limit on a road segment on which a vehicle is travelling, including steps of obtaining a first speed limit by querying a geospatial database on the basis of a geographical location of the vehicle, of determining a confidence index associated with the first speed limit, of determining a second speed limit by analyzing at least one image obtained from a sensor of the vehicle, of determining a confidence index associated with the second speed limit, of selecting the speed limit associated with the highest confidence index, and of configuring an item of equipment of the vehicle on the basis of the speed limit associated with the highest confidence index.

11 Claims, 3 Drawing Sheets

(51) Int. Cl.
*G06V 20/58* (2022.01)
*G08G 1/01* (2006.01)
*G08G 1/07* (2006.01)

(58) Field of Classification Search
CPC ............ G08G 1/0129; G08G 1/0967; G08G 1/09623; G08G 1/09627; G06V 20/582; B60W 30/146; B60W 40/02; B60W 2556/20; B60W 2420/403; B60W 2556/10; B60W 2555/60; B60W 2556/50
USPC .................................................. 701/93, 484
See application file for complete search history.

(56) References Cited

U.S. PATENT DOCUMENTS

| | | | |
|---|---|---|---|
| 10,275,664 B2 * | 4/2019 | Mullen | G08G 1/09675 |
| 11,900,805 B2 * | 2/2024 | Oba | G08G 1/096725 |
| 2009/0041304 A1 * | 2/2009 | Bradai | G08G 1/09626 382/104 |
| 2010/0188288 A1 | 7/2010 | Bahlmann et al. | |
| 2016/0042239 A1 | 2/2016 | Fowe et al. | |
| 2017/0116485 A1 * | 4/2017 | Mullen | G08G 1/09626 |
| 2017/0308759 A1 * | 10/2017 | Mullen | G06V 20/56 |
| 2019/0325235 A1 | 10/2019 | Stenneth et al. | |
| 2021/0407290 A1 * | 12/2021 | Oba | B60W 60/0053 |

FOREIGN PATENT DOCUMENTS

| | | | | |
|---|---|---|---|---|
| FR | 2919098 A1 | 1/2009 | | |
| GB | 2545310 A * | 6/2017 | ........... | G08G 1/0112 |
| WO | WO-2017029775 A1 * | 2/2017 | .......... | B60W 50/082 |

OTHER PUBLICATIONS

Kuppusamy, P., et al. "Traffic sign recognition for autonomous vehicle using optimized yolov7 and convolutional block attention module." Computers, Materials & Continua 77.1 (2023): 445-466. (Year: 2023).*

Zinoune, Clément, Philippe Bonnifait, and Javier Ibañez-Guzmán. "Sequential FDIA for autonomous integrity monitoring of navigation maps on board vehicles." IEEE Transactions on Intelligent Transportation Systems 17.1 (2015): 143-155. (Year: 2015).*

French Search Report for French Application No. FR2113325, dated Jun. 29, 2022 with translation, 10 pages.

* cited by examiner

METHOD, DEVICE AND SERVER FOR DETERMINING A SPEED LIMIT ON A ROAD SEGMENT

CROSS REFERENCE TO RELATED APPLICATIONS

This application claims priority to French Patent Application No. 2113325, filed Dec. 10, 2021, the contents of such application being incorporated by reference herein.

FIELD OF THE INVENTION

The invention belongs to the field of intelligent transportation and relates more particularly to a method for determining a legal speed limit on a particular road segment.

BACKGROUND OF THE INVENTION

The speed of vehicles, and notably their excessive speed, has for a long time been recognized as one of the main causes of mortality on roads. Thus, controlling the speed of vehicles is an effective means of improving safety.

For this purpose, the European Commission has proposed obligatory new safety standards, notably obliging manufacturers to integrate an ISA (Intelligent Speed Assistance) system into new vehicles sold in European territory.

The ISA system uses cameras with which a vehicle is equipped to detect and recognize speed limit signs in real time as a vehicle is travelling. It is thus possible to display, on the dashboard of the vehicle, the legal speed limit in force on the road segment on which it is travelling and/or configure a speed limiter or regulator.

However, it is still not possible to detect a speed limit from a camera. For example, a sign may be masked by another vehicle or by vegetation. Furthermore, some speed limits are implicit, as when entering a town. In other cases, atmospheric or sunlight conditions make it difficult to recognize speed limits indicated on road signs. The vehicle must then resort to a database in which associations between road segments and speed limits are stored.

This database may be stored in a memory of the vehicle or, indeed, accessible online via a cloud service. This last option has the advantage of making it possible to update the speed limits regularly and to reduce the memory required in the vehicle to store these data, and therefore the cost of such a system.

Using a database to mitigate the deficiencies of an on-board analysis system does, nevertheless, have drawbacks. Specifically, it is necessary to keep this database up to date in order to take into account modifications which may occur on the road network, for example because of ad hoc roadworks, regulations being modified, new traffic lanes being constructed or existing traffic lanes being modified. The extent of a national road network makes it difficult to update the legal speed limits in real time.

Thus, according to the circumstances, both the legal speed limits obtained from a database on board a vehicle or from an online service and the speed limits detected by a camera of the vehicle may lack reliability.

There is therefore a need for a method which makes it possible to obtain a legal speed limit with improved reliability.

SUMMARY OF THE INVENTION

For this purpose, a method for determining a speed limit on a road segment on which a vehicle is travelling is proposed, comprising the following steps:

obtaining a first speed limit by querying a geospatial database on the basis of a geographical location of the vehicle, determining a confidence index associated with the first speed limit, determining a second speed limit by analyzing at least one image obtained from a sensor of the vehicle, determining a confidence index associated with the second speed limit, selecting the speed limit associated with the highest confidence index, configuring an item of equipment of the vehicle on the basis of the speed limit associated with the highest confidence index.

The vehicle thus selects the most reliable data source for determining a speed limit. In this way, the method makes it possible for a vehicle to obtain a legal speed limit with improved reliability.

According to one particular embodiment, the confidence index associated with the first speed limit is proportional to the reliability of the geographical location.

An inaccurate geographical location may jeopardize correct identification of the road segment on which the vehicle is travelling, for example, when a vehicle enters a highway exit ramp or is travelling on a road parallel to another one. The speed limit obtained on the basis of an inaccurate location may then be wrong. By associating a lower confidence index in such circumstances, a speed limit detected by a camera of the vehicle is given preference and the reliability of the speed limit obtained is improved.

According to one particular embodiment, the reliability of the geographical location is determined at least according to the power of signals which are received by a GNSS receiver of the vehicle and the number of satellites from which signals are received.

The location accuracy of a GNSS receiver is proportional to the number of satellites and to the power of the signals received. Thus, when the GNSS receiver of a vehicle determines a location on the basis of a large number of satellites and/or signals of satisfactory power, the reliability of this method will be better.

According to one particular embodiment, the reliability of the geographical location is determined according to a history of correspondence between speed limits obtained by querying a database and speed limits obtained by analyzing images originating from a camera of the vehicle.

The fact that, over the course of a predetermined period which precedes a current instant, the speed limits detected by analyzing the images from a camera of the vehicle correspond to those obtained by querying a speed limit database, makes it possible to confirm the reliability of the geographical location of the vehicle.

According to one particular embodiment, the confidence index associated with the second speed limit is determined according to the type of sign on which the speed limit is detected, the confidence index being higher when the limit is detected on a temporary road sign than when it is detected on a non-temporary sign.

For the same road segment, a temporary speed limit indicated by a provisional road sign, for example because of roadworks, is often more up to date than a speed limit originating from a database. Thus, it is proposed to associate a particularly high confidence index with a speed limit recognized on a provisional sign.

According to one particular embodiment, the confidence index associated with the second speed limit is proportional to the probability of recognition determined by a predictive image recognition model.

Systems for recognizing speed limits by analyzing images implement predictive classification models, such as artificial neural networks. Such models associate a probability with each class which is liable to be detected, that is to say with each legal speed which is liable to be advertised on a sign.

According to one particular embodiment, the confidence index associated with the first speed limit is inversely proportional to the time elapsed since the last update of this limit in the database from which it originated.

Thus, when the first and second speed limits diverge, more weight is given to the speed limit originating from the database when the information which it contains is recent. Such an arrangement makes it possible, for example, when the first and second confidence indices are equivalent but the first and second speed limits diverge, to give preference to information originating from the database when it has been updated recently.

In one particular embodiment, the method further comprises:
  a step of determining a third confidence index on the basis of at least one criterion of correspondence between the first and the second speed limit determined, and
  a step of configuring at least one user interface of the vehicle on the basis of the third index determined.

In this way, the method makes it possible to associate an indicator of the reliability of the speed limit determined such that, when the speed limit determined by consulting a database corresponds to the speed limit determined on the basis of the images from a camera of the vehicle. Thus, it is possible to indicate to the user a degree of confidence which they may put in a speed limit determined. The third confidence index corresponds, for example, to a sum of the first and second confidence indices when the first and second speed limits are identical, and/or to a difference between the first and second confidence indices when the first and second speed limits differ. In this way, very high confidence is given to a speed limit when it is determined on the basis of two sources which converge, each having good reliability. A good confidence index is also assigned to a speed limit when one of the sources is particularly reliable and when the other one is particularly unreliable (that is to say, when the gap between the first and the second confidence index is large). Conversely, when the two sources diverge, but their reliability level differs little, the third confidence index is small.

According to one particular embodiment, the method comprises a step of updating a speed limit database when the confidence index associated with the second speed limit is greater than the confidence index associated with the first speed limit, and when the confidence index associated with the first speed limit is greater than a threshold.

It is thus proposed to update the database on the basis of a speed limit detected by a camera. The update is performed only when the reliability of detection by the camera is greater than the reliability of the information originating from the database, and when the information originating from the database is sufficiently reliable. Specifically, when the information originating from the database is reliable but does not correspond to a speed limit detected reliably, it is probable that a speed limit modification on the segment has taken place but that it has not been taken into account in the database.

According to one particular embodiment, the confidence index associated with the second speed limit is inversely proportional to the number of intersections and/or of changes in direction performed by the vehicle since a preceding detection of a speed limit in an image captured by a camera of the vehicle.

An indication given by a road sign is generally valid until the next intersection. Thus, a speed limit determined by a camera of the vehicle is less reliable after an intersection has been crossed.

According to another aspect, the invention relates to a device for determining a speed limit on a road segment on which a vehicle is travelling, the device comprising a processor and a memory in which instructions are recorded which are configured to implement the following steps, when they are carried out by the processor:
  obtaining a first speed limit by querying a database on the basis of a geographical location of the vehicle,
  determining a confidence index associated with the first speed limit,
  determining a second speed limit by analyzing at least one image obtained from a sensor of the vehicle,
  determining a confidence index associated with the second speed limit,
  selecting the speed limit associated with the highest confidence index,
  configuring an item of equipment of the vehicle on the basis of the speed limit associated with the highest confidence index.

An aspect of the invention also relates to an electronic control unit and/or to a vehicle comprising such a device.

An aspect of the invention also relates to a data medium comprising computer program instructions configured to implement the steps of a method for determining a speed limit as described above, when the instructions are carried out by a processor.

The data medium may be a non-volatile data medium such as a hard disk, a flash memory or an optical disk, for example.

The data medium may be any entity or device which is capable of storing instructions. For example, the medium may comprise a storage means, such as a ROM, RAM, PROM, EPROM, a CD ROM or indeed a magnetic recording means, for example a hard disk.

On the other hand, the data medium may be a transmissible medium such as an electrical or optical signal, which may be routed via an electrical or optical cable, by radio or by other means.

Alternatively, the data medium may be an integrated circuit into which the program is incorporated, the circuit being adapted to carrying out or to being used in carrying out the method in question.

The various aforementioned embodiments or features may be added, independently of or in combination with one another, to the steps of the method. The servers, devices, vehicles and data media have at least advantages which are analogous to those conferred by the method to which they relate.

BRIEF DESCRIPTION OF THE DRAWINGS

Other features, details and advantages of aspects of the invention will become apparent upon reading the detailed description hereinbelow, and upon analyzing the appended drawings, among which.

DETAILED DESCRIPTION OF THE PREFERRED EMBODIMENTS

Figure 1:
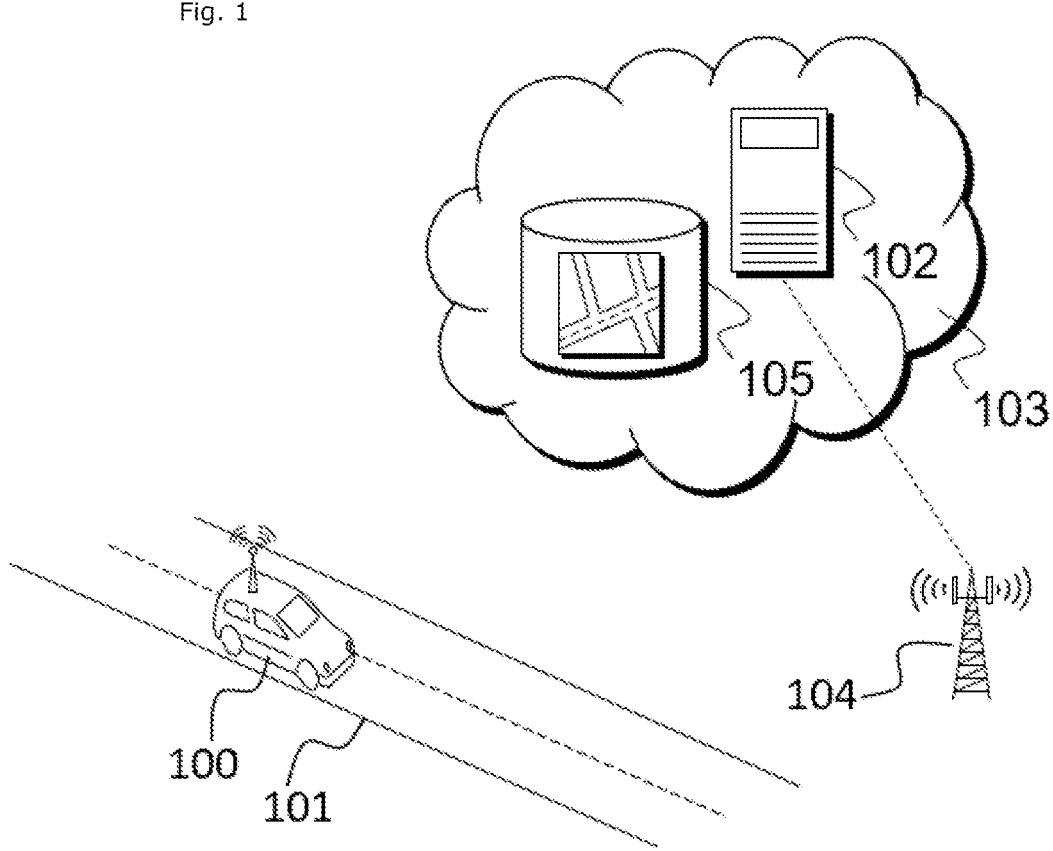
FIG. 1 shows an environment adapted to implementing a method for determining a speed limit according to one particular embodiment.

FIG. 1 shows a vehicle 100 travelling on a road segment 101. The vehicle 100 comprises a telecommunication control unit (TCU) making it possible for it to exchange messages with a server 102 of a communication network 103. The communication module is, for example, a wireless network interface adapted to being connected to a cellular access network 104 of 2G, 3G, 4G, 5G, Wi-Fi® or WiMAX® type interconnected with the communication network 103.

The vehicle 100 also comprises a computer, for example an ECU (Electronic Control Unit). The computer comprises a processor and a memory into which computer program instructions are loaded.

The vehicle 100 is equipped with a driver assistance system notably comprising a camera configured to capture images of the environment of the vehicle and carry out analysis of these images in order to detect the presence of road signs in them and interpret their content.

The vehicle 100 finally comprises a geolocation device, for example a GNSS (Global Navigation Satellite System) receiver adapted to determining geographical coordinates of the vehicle by trilateration on the basis of signals transmitted by satellites. The GNSS receiver transmits, at regular intervals, the location determined to the computer of the vehicle, as well as an orientation, via a CAN (Controller Area Network) communication bus.

The server 102 is a processing server offering online services of cloud type to a plurality of vehicles. To this end, the server comprises communication means, for example an Ethernet network card, making it possible for it to exchange messages with other devices, and notably to receive requests from the vehicle 100 and to respond to these requests.

The server 102 comprises a processor and a memory in which program instructions are recorded which are configured to make it possible to query a database 105 in order to obtain a legal speed limit associated with a particular road segment.

The database 105 comprises a digital representation of a road network, and notably a descriptor of each segment of the road network. In the database 105, a segment of road is at least associated with a legal speed limit and direction of travel. Other objects of the database make it possible to describe the relationships between segments, for example the connections from an arrival point of a segment to one or more departure points of another segment, as well as their geometrical and geographical configuration. In this instance, the database 105 comprises at least one record relating to the road segment 101. In one particular embodiment, the database 105 is stored in a memory of the vehicle.

Figure 2:
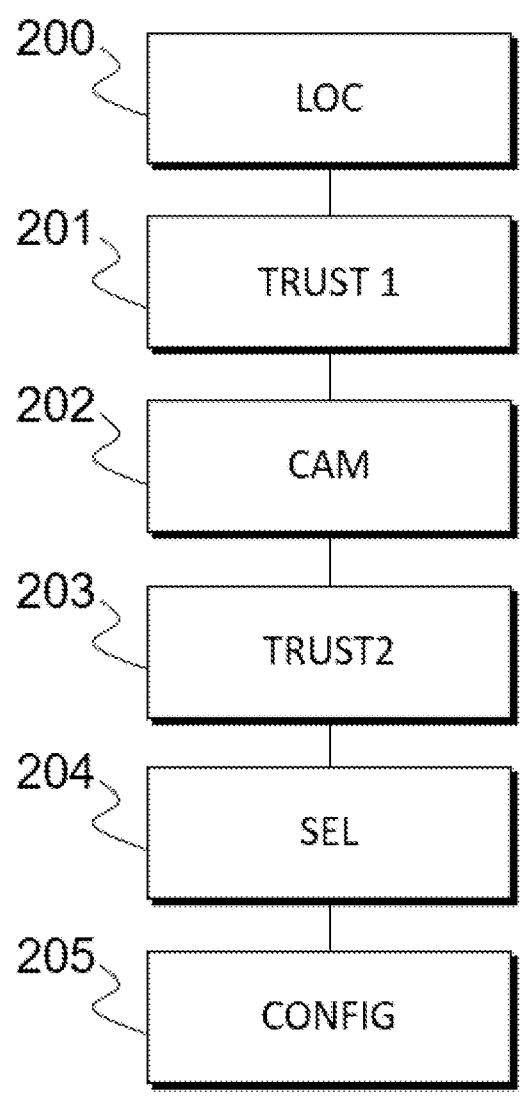
FIG. 2 is a flowchart showing the main steps of a method for determining a speed limit according to one particular embodiment.

The determination method will now be described with reference to FIG. 2.

During a first step 200, the vehicle obtains a first legal speed limit for the segment 101 on which it is travelling. To this end, the vehicle obtains its geographical location from a GNSS receiver and transmits, to the server 102, a speed limitation request comprising the location obtained and its orientation. Upon receiving such a request, the server 102 determines, by map matching, an identifier of the road segment corresponding to the geographical location transmitted in the request. To this end, the server uses a conventional technique, referred to as geographical matching (map matching), according to which a geographical location is matched with a digital representation of the road network so as to determine the position of the vehicle on the road network. The server queries the database 105, for example by means of an SQL (Structured Query Language) request, in order to obtain a legal speed limit associated with the road segment corresponding to the location received. The server 102 uses the orientation of the vehicle transmitted in the speed limit request to determine a direction of travel of the vehicle on the segment. The speed limit thus determined is transmitted to the vehicle 100 in response to the request. The vehicle 100 thus has a first legal speed limit for the segment on which it is travelling.

In the step 201, the vehicle 100 determines a confidence index associated with the first speed limit obtained in the step 200. To this end, the vehicle 100 uses raw data transmitted by the GNSS receiver with the location data. The raw data comprise at least a number of satellites having served to determine the geographical location, as well as the power of the signals which are transmitted by these satellites. The confidence index determined is higher the larger the number of satellites used to determine the location. The confidence index is also proportional to the quality of the signals which are received by the GNSS receiver, notably to their power. Thus, a low confidence index is associated with a speed limit obtained on the basis of a location which is liable to be wrong. In contrast, the more accurate the location is, the higher the confidence index associated with the speed limit obtained. Thus, the confidence index associated with the first speed limit is proportional to the reliability of the geographical location supplied by the GNSS receiver.

In one particular embodiment, the reliability of the geographical location is determined according to a history of correspondence between speed limits obtained by querying a database and speed limits obtained by analyzing images originating from a camera of the vehicle. In other words, when the speed limits obtained by querying the server 102 and the speed limits determined by analyzing images originating from a camera of the vehicle in which there are detected speed limits on road signs detected coincide, for a certain time, for example for the last 15 minutes, the vehicle may deduce therefrom that the location supplied by the GNSS receiver is reliable.

According to one particular embodiment, the reliability of the geographical location is determined by matching the location of the vehicle when a particular object detected by a camera of the vehicle with a location of this same object stored in a geospatial database. The object is a reference object, for example an element of road infrastructure the absolute location of which is recorded in a database. The reliability of the location is thus inversely proportional to a divergence between the locations of the object.

During a step 202, the vehicle 100 determines a second speed limit by analyzing at least one image obtained from a sensor of the vehicle. To this end, the driver assistance system comprises a predictive model trained to identify speed limit signs in images captured by the camera of the vehicle, and carry out image recognition to extract therefrom the speed limit indicated. The driver assistance system uses, to this end, a predictive model previously trained for this purpose. The predictive model is a classification model adapted to predicting a probability of correct recognition for the various speed limitations which are liable to be indicated on signs. Thus, when an image in which a road sign indicating a speed limited to 50 km/h appears, the model produces, for example, an output vector such as:
{{30:0.05}, {50:0.7}, {80:0.05}, {90:0.2}, {110:0}, {130: 0}}
In this vector, each class for which the model was trained (here, 30 km/h, 50 km/h, 80 km/h, 90 km/h, 110 km/h and 130 km/h) is associated with a probability of occurrence in the image submitted as input to the model. Thus, in this example, a probability of 0.7 is associated with the class 50 km/h. The driver assistance system then considers that the speed limitation for the current segment is 50 km/h.

The predictive model is preferably a convolutional neural network, or CNN, making deep learning possible and particularly adapted to image recognition.

In the step 203, the vehicle determines a confidence index associated with the second speed limit thus determined. To this end, in one particular embodiment, the vehicle uses the probabilities associated with the various classes for which the predictive model was trained. More specifically, the confidence index associated with a speed limitation detected by image recognition is proportional to the probability associated with the most probable class. Thus, in relation to the preceding example, with the 50 km/h class being associated with a markedly higher probability than the other classes, the confidence index associated with the second speed limit is high.

By contrast, in the case of an image comprising a sign which is dirty or partially obscured by vegetation, or captured in weather or sunlight conditions reducing visibility, the model may produce a less definite result, for example:
{{30:0.05}, {50:0.45}, {80:0.1}, {90:0.4}, {110:0}, {130: 0}}
It is noted that the 50 km/h and 90 km/h classes are associated with relatively close probabilities: 0.45 and 0.4, respectively. Although the 50 km/h class is more probable, the level of reliability of recognition is lower. The vehicle then associates a low confidence index with the second speed limit.

According to one particular embodiment, the confidence index associated with the second speed limit is inversely proportional to the interval separating the current instant from the last speed limit detected in an image. In other words, the confidence index decreases with the age of the last detection. Thus, the more the lapse between the last speed limitation detected and the current instant increases, the more the confidence index associated with this second speed limit decreases.

According to one particular embodiment, the confidence index associated with the second speed limit is inversely proportional to the number of intersections crossed and/or to the number of changes in direction performed by the vehicle since the last detection of a speed limit in an image captured by a camera of the vehicle. An intersection and/or a change in direction is, for example, detected by map matching of the position of the vehicle with a digital map.

In one particular embodiment, the confidence index associated with a detection made by analyzing an image comprising a temporary speed limit sign is higher than when the speed limit is detected on a conventional sign. To this end, the predictive model is trained to recognize temporary signs, for example on the basis of the color of the sign, or of the type of base. A temporary speed limit sign, installed, for example, on the occasion of ad hoc roadworks, is generally placed on the ground on a removable base. Furthermore, a temporary speed limitation may be associated with an indicative sign of a particular color, for example orange. These particular features make it possible for a predictive model trained on the basis of a dataset comprising images of such signs to distinguish, by distinct classes, temporary limitations from permanent limitations. Thus, when the predictive model indicates that a temporary speed limit has been detected, the confidence index associated with this limit is higher than in the event of a permanent speed limitation.

During a step 204, the vehicle compares the confidence index determined for the first speed limit obtained by querying the server 102 and the confidence index associated with the second speed limit determined by analyzing an image captured by a camera of the vehicle and selects the speed limit associated with the highest confidence index.

According to one particular embodiment, the method further comprises a step of determining a third confidence index on the basis of at least one criterion of correspondence between the first and the second speed limit determined, and a step of configuring at least one user interface of the vehicle on the basis of the third confidence index determined.

The third confidence index corresponds, for example, to a sum of the first and second confidence indices when the first and second speed limits are identical, and/or to a difference between the first and second confidence indices when the first and second speed limits differ.

The third confidence index thus corresponds to the reliability of the speed limit determined and may be used to configure a reliability indicator, for example a warning light of a particular color or a message on a screen to indicate to the user to be particularly vigilant. The third indicator may also be used to configure a speed limiter and/or regulator, for example by deactivating it when the third confidence index is less than a threshold.

In the step 205, the speed limitation selected is used to configure an item of equipment of the vehicle. According to one particular embodiment, the speed limit selected is used to configure a display on which the limit which is currently valid on the segment is displayed. According to one particular embodiment, the speed limit selected is used to configure a speed limiter or regulator of the vehicle, or indeed to configure a device for raising a visual or audio alarm in the event of said speed limit being exceeded.

Figure 3:
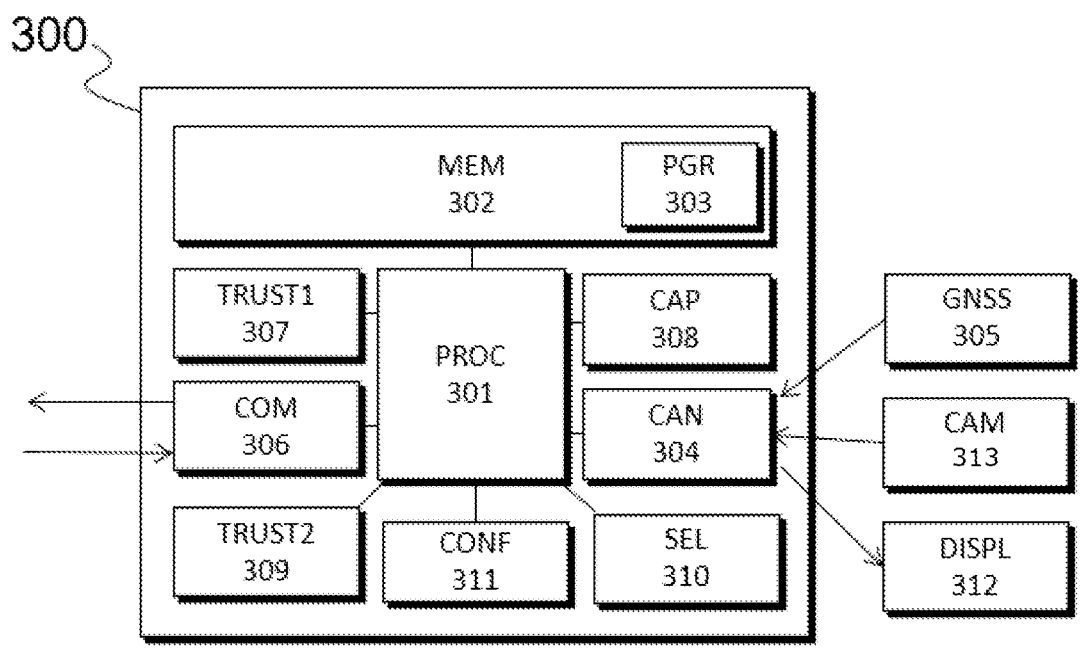
FIG. 3 shows the architecture of a device adapted to implementing a method for determining a speed limit according to one particular embodiment.

FIG. 3 shows the architecture of a device 300 adapted to implementing a method for determining a speed limit according to one particular embodiment of the invention.

The device 300 comprises a storage space 302, for example a memory MEM, and a processing unit 301 which is equipped, for example, with a processor PROC. The processing unit may be controlled by a program 303, for example a computer program PGR, implementing the method for determining a speed limit described with reference to FIG. 2 and, in particular, the steps of obtaining a first speed limit by querying a geospatial database on the basis of a geographical location of the vehicle, of determining a confidence index associated with the first speed limit, of determining a second speed limit by analyzing at least one image obtained from a sensor of the vehicle, of determining a confidence index associated with the second speed limit, of selecting the speed limit associated with the highest confidence index, and of configuring an item of equipment of the vehicle on the basis of the speed limit associated with the highest confidence index.

Upon initialization, the instructions of the computer program 303 are, for example, loaded into a RAM (Random Access Memory) before being carried out by the processor of the processing unit 301. The processor of the processing unit 301 implements the steps of the method for determining a speed limit according to the instructions of the computer program 303.

To this end, besides the memory and the processor, the device 300 comprises a communication bus 304, for example a CAN bus making it possible for it to exchange data with other devices of the vehicle, and in particular to receive a location datum and an orientation of the vehicle which is determined by a location device 305, for example a GNSS receiver.

The device 300 also comprises a communication module 306, for example a cellular network interface COM, adapted to exchanging messages with other devices via a cellular network of 2G, 3G, 4G, 5G, Wi-Fi® or WiMAX® type, and notably to transmitting, to a server, a message comprising a location and an orientation of the vehicle which is obtained via the communication bus 304, and to receiving in return a legal speed limitation in force on the segment on which the vehicle is travelling, the limitation originating from a geospatial database comprising speed limitations which are associated with road segments of a road network.

The device 300 also comprises a module 307 for determining a confidence index associated with the speed limitation received by the communication module 306 in response to a request transmitted by the vehicle. The module 307 is, for example, implemented by computer program instructions intended to be carried out by the processor PROC of the processing unit and configured to obtain, via the communication bus 304, a raw positioning datum comprising at least a number of satellites and the power of the signals having contributed to determining the location of the vehicle, and to associate, with the speed limit obtained, a confidence index which is higher the higher the number of satellites and/or the signal power.

The device 300 further comprises an image analysis module 308 adapted to detecting and recognizing a speed limit inscribed on a road sign which is present in an image captured by a camera 313 of the vehicle. To this end, the analysis module 308 is implemented by computer program instructions configured to implement a classification learning model trained in advance, for example a convolutional neural network, adapted to determining probabilities associated with speed limits which are liable to be shown on the sign.

The device 300 also comprises a module 309 for determining a confidence index associated with the speed limitation detected by the analysis module 308. The module 308 is implemented by computer program instructions configured to determine a confidence index according to at least the value of a probability associated with the speed limit class for which the highest probability was determined by the analysis module 308, so that the index determined is higher the higher the probability associated with the majority class.

The device 300 further comprises a selection module 310 adapted to comparing the confidence index determined by the module 307 with the confidence index determined by the module 310 and selecting the speed limit associated with the highest confidence index.

The device 300 finally comprises a configuration module 311 adapted to configuring at least one device of the vehicle on the basis of the speed limit selected by the selection module 310. For example, the configuration module comprises instructions adapted to causing a speed limit indication to be displayed on a display 312 of the vehicle by sending an appropriate command via the communication bus 304.

According to one particular embodiment, the device is integrated into an electronic control unit of a vehicle, for example an ECU.

The invention claimed is:

1. A method for determining a speed limit on a road segment on which a vehicle is travelling, comprising:
    Obtaining, by a processor, a first speed limit by querying a geospatial database on the basis of a geographical location of the vehicle;
    Determining, by the processor, a confidence index associated with the first speed limit based on at least one of a reliability of the geographical location or the time elapsed since the last update of the first speed limit in the database from which it originated;
    Determining, by the processor, a second speed limit by analyzing at least one image obtained from a sensor of the vehicle;
    Determining, by the processor, a confidence index associated with the second speed limit based on at least one of the number of intersections crossed and/or the number of changes in direction performed by the vehicle since a preceding detection of a speed limit in an image captured by a camera of the vehicle, a probability of recognition of the second speed limit determined by a predictive image recognition model, or the type of sign on which the speed limit is detected;
    Selecting, by the processor, the speed limit associated with the highest confidence index; and
    Configuring, by the processor, an item of equipment of the vehicle selected from the group consisting of configuring a display on which the selected speed limit is displayed, configuring a speed limiter or regulator of the vehicle, and configuring a device for raising a visual or audio alarm in the event of the selected speed limit being exceeded, wherein the configuring is based on the selected speed limit.

2. The method as claimed in claim 1, wherein the confidence index associated with the second speed limit is higher when the speed limit is detected on a temporary road sign than when it is detected on a non-temporary road sign.

3. The method as claimed in claim 1, wherein the reliability of the geographical location is determined at least according to the power of signals which are received by a GNSS receiver of the vehicle and the number of satellites from which signals are received.

4. The method as claimed claim 1, wherein the reliability of the geographical location is determined according to a history of correspondence between speed limits obtained by querying a database and speed limits obtained by analyzing images originating from a camera of the vehicle.

5. The method as claimed claim 3, wherein the reliability of the geographical location is determined according to a history of correspondence between speed limits obtained by querying a database and speed limits obtained by analyzing images originating from a camera of the vehicle.

6. A device for determining a speed limit on a road segment on which a vehicle is travelling, the device comprising a processor and a memory in which instructions are recorded which are configured to implement the following steps, when they are carried out by the processor:
    Obtaining, by the processor, a first speed limit by querying a database on the basis of a geographical location of the vehicle;
    Determining, by the processor, a confidence index associated with the first speed limit based on at least one of a reliability of the geographical location or the time elapsed since the last update of the first speed limit in the database from which it originated;

Determining, by the processor, a second speed limit by analyzing at least one image obtained from a sensor of the vehicle;

Determining, by the processor, a confidence index associated with the second speed limit based on at least one of the number of intersections crossed and/or to the number of changes in direction performed by the vehicle since a preceding detection of a speed limit in an image captured by a camera of the vehicle, a probability of recognition of the second speed limit determined by a predictive image recognition model, or the type of sign on which the speed limit is detected;

Selecting, by the processor, the speed limit associated with the highest confidence index; and Configuring, by the processor, an item of equipment of the vehicle selected from the group consisting of configuring a display on which the selected speed limit is displayed, configuring a speed limiter or regulator of the vehicle, and configuring a device for raising a visual or audio alarm in the event of the selected speed limit being exceeded, wherein the configuring is based on the selected speed limit.

7. A non-transitory data medium comprising computer program instructions which are configured to implement the steps of a method as claimed in claim 1, when the instructions are carried out by a processor.

8. The method as claimed in claim 1, further comprising:
determining a third confidence index on the basis of at least one criterion of correspondence between the first and the second speed limit determined; and
configuring at least one user interface of the vehicle on the basis of the third index determined.

9. The method as claimed in claim 1, further comprising updating a speed limit database when the confidence index associated with the second speed limit is greater than the confidence index associated with the first speed limit, and when the confidence index associated with the first speed limit is greater than a threshold.

10. A vehicle, comprising a device as claimed in claim 6.

11. An electronic control unit for a vehicle, comprising a device as claimed in claim 6.

* * * * *